No. 858,175. PATENTED JUNE 25, 1907.
J. HANCHETT.
SAW SWAGE.
APPLICATION FILED MAR. 14, 1906.
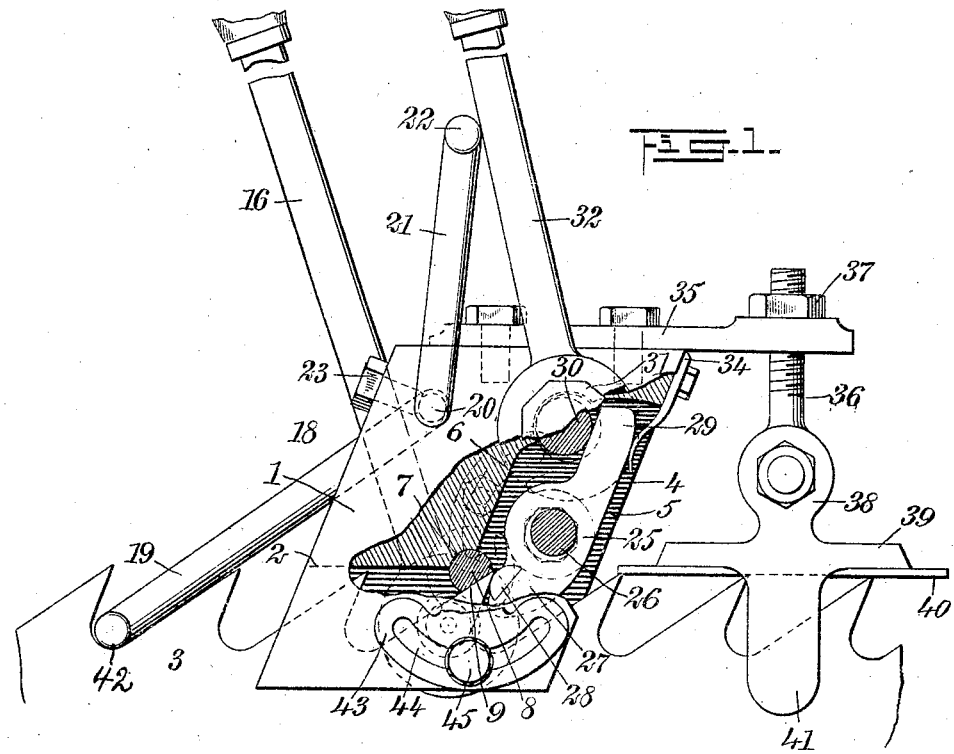
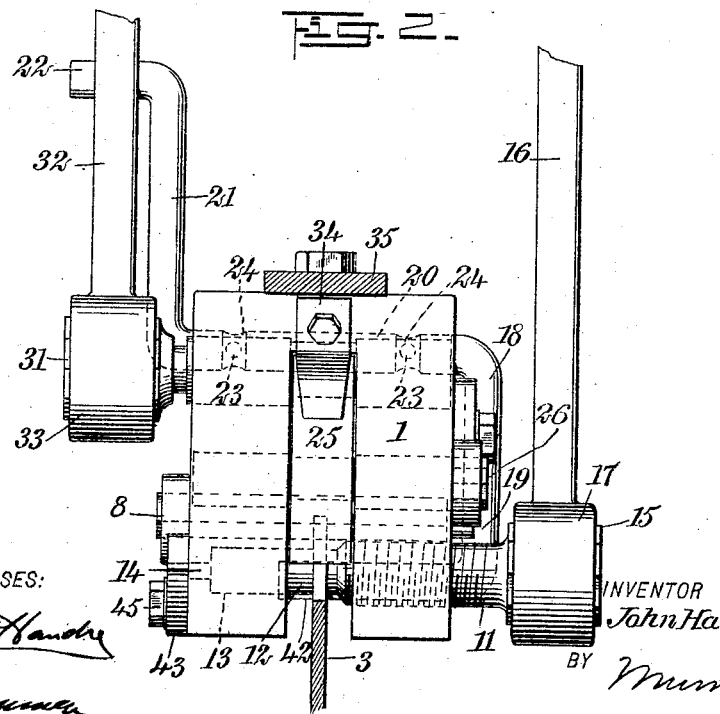
WITNESSES:
INVENTOR
John Hanchett
BY
ATTORNEYS
THE NORRIS PETERS CO., WASHINGTON, D. C.

UNITED STATES PATENT OFFICE.

JOHN HANCHETT, OF SHERIDAN, MICHIGAN.

SAW-SWAGE.

No. 858,175.   Specification of Letters Patent.   Patented June 25, 1907.

Application filed March 14, 1906. Serial No. 305,984.

*To all whom it may concern:*

Be it known that I, JOHN HANCHETT, a citizen of the United States, and a resident of Sheridan, in the county of Montcalm and State of Michigan, have invented a new and Improved Saw-Swage, of which the following is a full, clear, and exact description.

This invention relates to saw swages. It is useful for swaging the teeth of large and small saws.

The object of the invention is to produce a device of this class which is simple in construction and which may be readily attached to the saw blade and as readily manipulated.

The invention consists in the construction and combination of parts, to be more fully described hereinafter and particularly set forth in the claims.

Reference is to be had to the accompanying drawings forming a part of this specification, in which similar characters of reference indicate corresponding parts in all the figures.

Figure 1 is a side elevation showing a portion of a saw blade with the swage operating thereupon; a portion of the swage being broken away and shown in section; and Fig. 2 is substantially a front elevation of the swage, showing a portion thereof and a portion of the saw blade in cross section.

Referring more particularly to the parts, 1 represents the body of the swage, which consists of a block, preferably of forged steel or similar material, and this block is preferably formed with its vertical axis inclined as shown. Its lower face is provided with a central channel or groove 2, adapted to receive the toothed edge of the saw blade 3, as indicated in Fig. 1. The forward face 4 of the block 1 is cut away so as to form a recess 5, the bottom face 6 of which extends downwardly substantially parallel with the forward face 4 of the block, and where it meets the bottom of the channel 2, a concave face 7 is formed to receive an anvil 8. This anvil 8 consists of a round bolt or stud, formed on one side with a flat face 9, adapted to come against the sides of the teeth respectively, as indicated in Fig. 1.

In the lower portion of the block a clamping screw 11 is mounted, the inner extremity whereof is adapted to be forced against the saw blade 3, as shown in Fig. 2, so as to clamp the same against a removable stud 12, mounted in a socket 13 formed in the side face of the channel 2. For the purpose of facilitating the removal of this stud 12 the side of the block near the bottom of the socket is provided with an opening 14 into which a pin may be driven, which will force the stud inwardly and out of the socket, as will be readily understood. The clamping screw 11 is preferably formed with an angular head 15 to which a lever 16 may be applied, said lever having a wrench socket 17 adapted to engage the head 15. In the upper portion of the block 1, a brace 18 is attached, the same consisting of an arm 19, adapted to engage the notches between the teeth of the saw 3, as indicated in Fig. 1, the said arm being formed integrally with a shank 20, which passes longitudinally through the block as shown. The opposite extremity of this shank is turned up to form an arm 21, terminating in a laterally disposed finger 22. The brace 18 is held in position in the block by means of set screws 23, the inner extremities whereof are received in grooves 24 formed in the shank 20, as indicated most clearly in Fig. 2.

In the recess 5 is mounted a die holder 25, having substantially the form shown in Fig. 1. This die holder is pivotally mounted on an eccentric bolt 26, and is formed with a nose 27 carrying a removable die 28. Its upper extremity is formed with a tail 29 which lies against the face of the eccentric swaging bolt 30, which passes transversely through the block 1 as shown. This bolt 30 is formed at its outer extremity with an angular head 31 to which a removable lever 32 may be applied, said lever having a wrench socket 33 similar to the wrench socket 17 referred to above. On the face 4 of the block, a leaf spring 34 is attached, which presses against the outer face of the tail 29 of the die holder 25, and holds the same against the swaging bolt.

To the upper face of the block 1 is attached a bracket plate 35, which extends forwardly as shown and supports a bolt 36, which has a threaded connection therewith, as indicated. The bolt 36 receives a check nut 37, which screws against the face of the bracket plate 35 so as to securely lock the bolt 36 in any adjusted position desired. To the lower extremity of the bolt 36 a rider or saddle 38 is attached, the same comprising a horizontal body 39 which receives a face strip 40 which rests against the teeth of the saw 3 as shown. At its middle point the body 39 is provided with fingers 41 which project down on each side of the saw so as to maintain the rider in position, as will be readily understood.

The swage will be applied to the saw blade as indicated most clearly in Fig. 1, the brace 18 affording means for supporting the rear portion of the block. For this purpose, the arm 19 of the brace is provided with a laterally disposed finger 42 at its lower extremity, which rests in the notch between the teeth of the saw, as shown. The swage will be brought into position so that the flat face 9 of the anvil lies against the more inclined face of the tooth, whereupon the swaging lever 32 is rotated in the direction of the brace 18, so that the eccentric bolt 30 will operate the die holder. In this way the die 28 which lies opposite the anvil, is pressed with great force against the point of the tooth which is being swaged. As indicated in Fig. 2, the finger 22 of the arm 21 projects into the path of the lever 32, and is intended to operate as a stop to limit the movement of this lever.

In order to enable the angular position of the flat face 9 of the anvil to be adjusted, the extremity of the anvil which projects at the left of the block, as indicated in Fig. 2, has rigidly attached thereto a segment 43, having a curved slot 44 through which a clamping bolt 45 passes. Evidently, by rotating, this segment and clamping the same in different positions, the anvil may be adjusted as desired. This adjustment is necessary so as to adapt the anvil to the different inclination of teeth found on saws of different forms.

The eccentric on the bolt 26 is for the purpose of adjusting the opening between the anvil 8 and the die 28, and for regulating the amount of swaging to be done on the saw teeth, and said bolt is adjusted by a segment 40 shown in dotted lines in Fig. 1, and similar to the segment 43 which adjusts the anvil 8.

The arm 21 of the brace 20 acts as a handle to be seized in moving the swage to the next tooth. While it enables the swage-block to be lifted or slid along it also enables the arm 19 to be controlled. In this way the practical efficiency of the machine is much increased.

Having thus described my invention, I claim as new and desire to secure by Letters Patent:—

In a saw swage, in combination, a block having a channel in the under face thereof adapted to receive the edge of the saw blade, an anvil mounted in said block, a swaging device attached to said block and coöperating with said anvil, a lever actuating said swaging device, a brace rotatably mounted in said block having an arm engaging between the saw teeth of said blade, and having a second arm projecting into the path of said lever and constituting a stop therefor.

In testimony whereof I have signed my name to this specification in the presence of two subscribing witnesses.

JOHN HANCHETT.

Witnesses:
 A. N. RUSSELL,
 F. B. THAYER.